United States Patent [19]

Trojan et al.

[11] Patent Number: 5,499,841
[45] Date of Patent: Mar. 19, 1996

[54] VEHICLE SAFETY APPARATUS A HOUSING ASSEMBLY FOR AN AIR BAG AND VEHICLE HORN SWITCH

[75] Inventors: Donna M. Trojan, Clarkston, Mich.; Michael E. Heidorn, Mesa, Ariz.

[73] Assignee: TRW Vehicle Safety Systems Inc., Lyndhurst, Ohio

[21] Appl. No.: 306,249

[22] Filed: Sep. 14, 1994

Related U.S. Application Data

[63] Continuation of Ser. No. 36,185, Mar. 23, 1993, abandoned.

[51] Int. Cl.⁶ .................................................. B60R 21/22
[52] U.S. Cl. ................................. 280/731; 200/61.54
[58] Field of Search ........................... 280/731, 728 R, 280/728 B, 732; 200/61.54, 61.55, 512

[56] References Cited

U.S. PATENT DOCUMENTS

| | | | |
|---|---|---|---|
| 3,819,205 | 6/1974 | Dunford et al. | 280/731 |
| 4,325,568 | 4/1982 | Clark et al. | 280/731 |
| 4,440,990 | 4/1984 | Nozaki | 200/512 |
| 4,934,735 | 6/1990 | Embach | 280/731 |
| 5,002,306 | 3/1991 | Hiramitsu et al. | 280/731 |
| 5,062,661 | 11/1991 | Winget | 280/731 |
| 5,085,462 | 2/1992 | Gualtier | 280/731 |
| 5,186,490 | 2/1993 | Adams et al. | 280/731 |
| 5,193,412 | 3/1993 | Hashiba | 200/61.54 |
| 5,308,106 | 5/1994 | Heidorn | 280/728 B |
| 5,338,059 | 8/1994 | Inoue et al. | 280/728 B |
| 5,371,333 | 12/1994 | Kanai et al. | 200/61.54 |

FOREIGN PATENT DOCUMENTS

| | | | |
|---|---|---|---|
| 3-143749 | 6/1991 | Japan | 280/731 |
| 4-78744 | 3/1992 | Japan | 280/731 |
| 4-206408 | 7/1992 | Japan | 200/512 |

Primary Examiner—Eric D. Culbreth
Attorney, Agent, or Firm—Tarolli, Sundheim & Covell

[57] ABSTRACT

A vehicle safety apparatus includes a housing assembly (24) which is mounted on a steering wheel (22) of a vehicle. The housing assembly (24) encloses an air bag (38) and an inflator (44). In addition, the housing assembly (24) encloses a horn switch (58). The housing assembly (24) includes an inner cover (34) which is secured to a base (28) and an outer cover (36) which at least partially encloses the inner cover. The horn switch (58) is disposed between the inner and outer covers (34 and 36). The horn switch (58) is formed as a unit and includes a pair of electrically conductive layers (134 and 136) of material which are enclosed by an envelope (142) of electrically insulating material. The horn switch (58) has a unitary construction which facilitates installation of the horn switch between the inner and outer covers (34 and 36) and, if necessary, removal of a defective horn switch. To facilitate removal of a defective horn switch (58), the outer cover (36) is movable relative to the inner cover (34) to expose the horn switch (58) while the inner cover remains secured to the base (28) and the outer cover remains secured to the inner cover and the base.

27 Claims, 8 Drawing Sheets

5,499,841

VEHICLE SAFETY APPARATUS A HOUSING ASSEMBLY FOR AN AIR BAG AND VEHICLE HORN SWITCH

This is a continuation of application Ser. No. 08/036,185 filed on Mar. 23, 1993, now abandoned.

BACKGROUND OF THE INVENTION

The present invention relates to a housing assembly which encloses an air bag and a horn switch on a steering wheel of a vehicle having a horn.

A known housing assembly for enclosing an air bag and a horn switch on a steering wheel of a vehicle is disclosed in U.S. Pat. application Ser. No. 592,948, filed Oct. 4, 1990 by Michael E. Heidorn and entitled "Air Bag Module Cover Assembly With Horn Blowing Switch". The apparatus disclosed in this patent application includes an air bag module cover assembly in which a horn switch is incorporated.

SUMMARY OF THE INVENTION

The present invention provides a new and improved housing assembly for enclosing an air bag and a horn switch on a steering wheel of a vehicle. The housing assembly includes an inner cover which at least partially encloses the air bag and is connected with a base. An outer cover at least partially encloses the inner cover and the air bag. A horn switch is disposed between the inner and outer covers.

The horn switch is an assembled unit which facilitates installation and removal of the horn switch from the housing assembly. The horn switch includes a pair of layers of electrically conductive material. An envelope of electrically insulating material encloses the layers of electrically conductive material.

A connector secures the outer cover of the housing assembly to the base. Upon releasing the connector, a portion of the outer cover is movable away from the inner cover to expose the horn switch. The exposed horn switch is readily removed, as a unit, from between the inner and outer covers and a new horn switch is easily installed. During the removal and replacement of the horn switch, the inner and outer covers remain interconnected in order to block access to the air bag enclosed by the housing assembly.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein.

DESCRIPTION OF ONE SPECIFIC PREFERRED EMBODIMENT OF THE INVENTION

General Description

Figure 1:
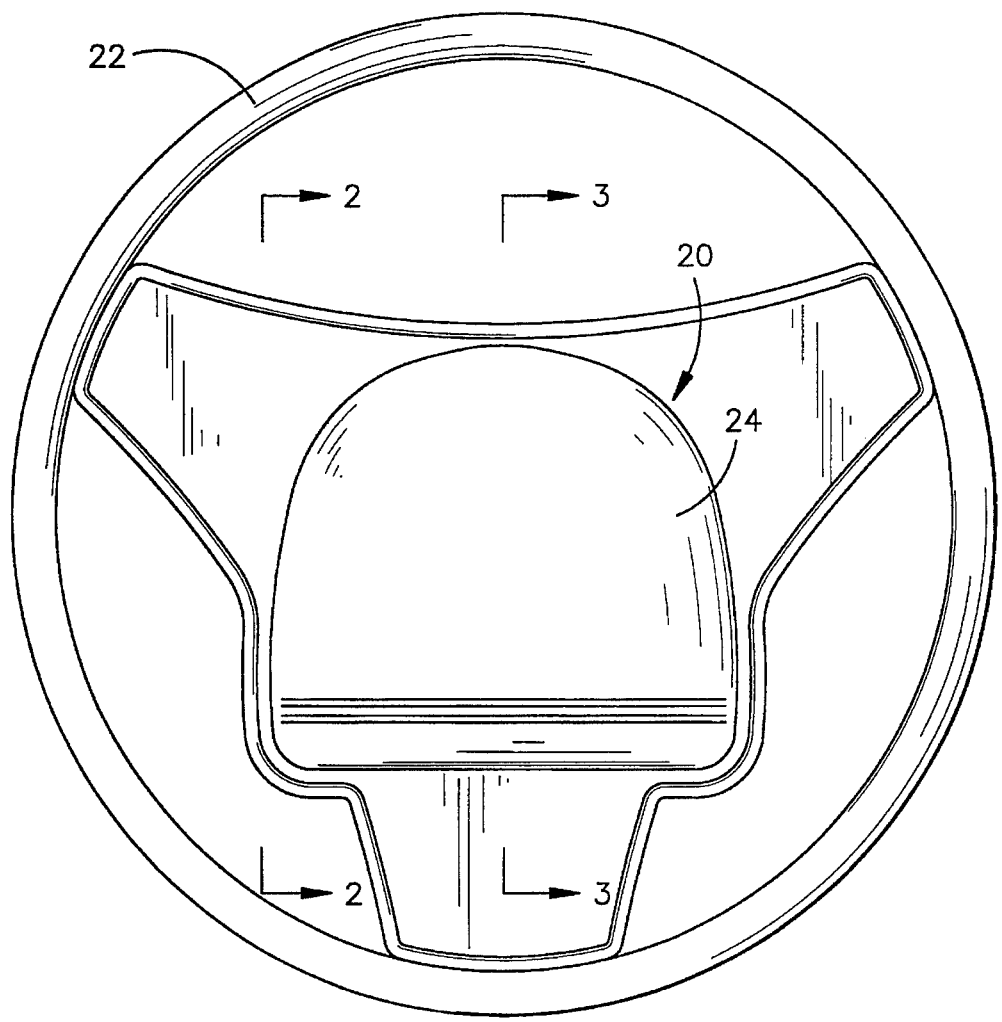
FIG. 1 is a schematic plan view illustrating a safety apparatus constructed in accordance with the present invention installed on a steering wheel of a vehicle.

A vehicle safety apparatus 20, constructed in accordance with the present invention, is illustrated in FIG. 1 mounted on a steering wheel 22 of a vehicle. The vehicle safety apparatus 20 includes a housing assembly 24. The housing assembly 24 includes a generally rectangular metal base 28 (FIG. 2) which is connected with the steering wheel by suitable connectors which engage mounting flanges 30 which are part of the base. Although only a single mounting flange 30 has been shown in FIG. 2, it should be understood that there are two mounting flanges, disposed on opposite sides of the base 28.

Figure 2:
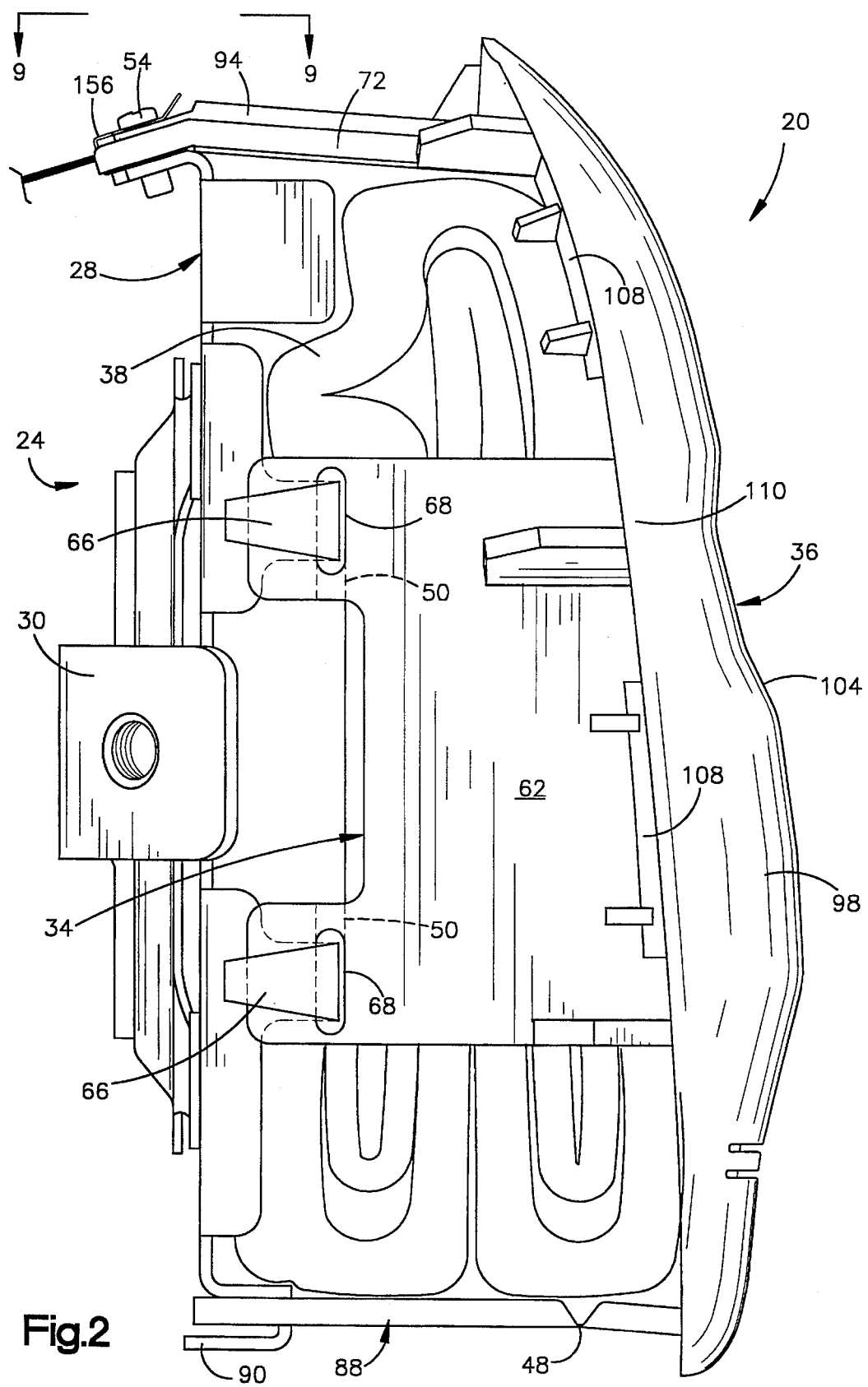
FIG. 2 is an enlarged side elevational view, taken generally along the line 2—2 of FIG. 1.
Figure 3:
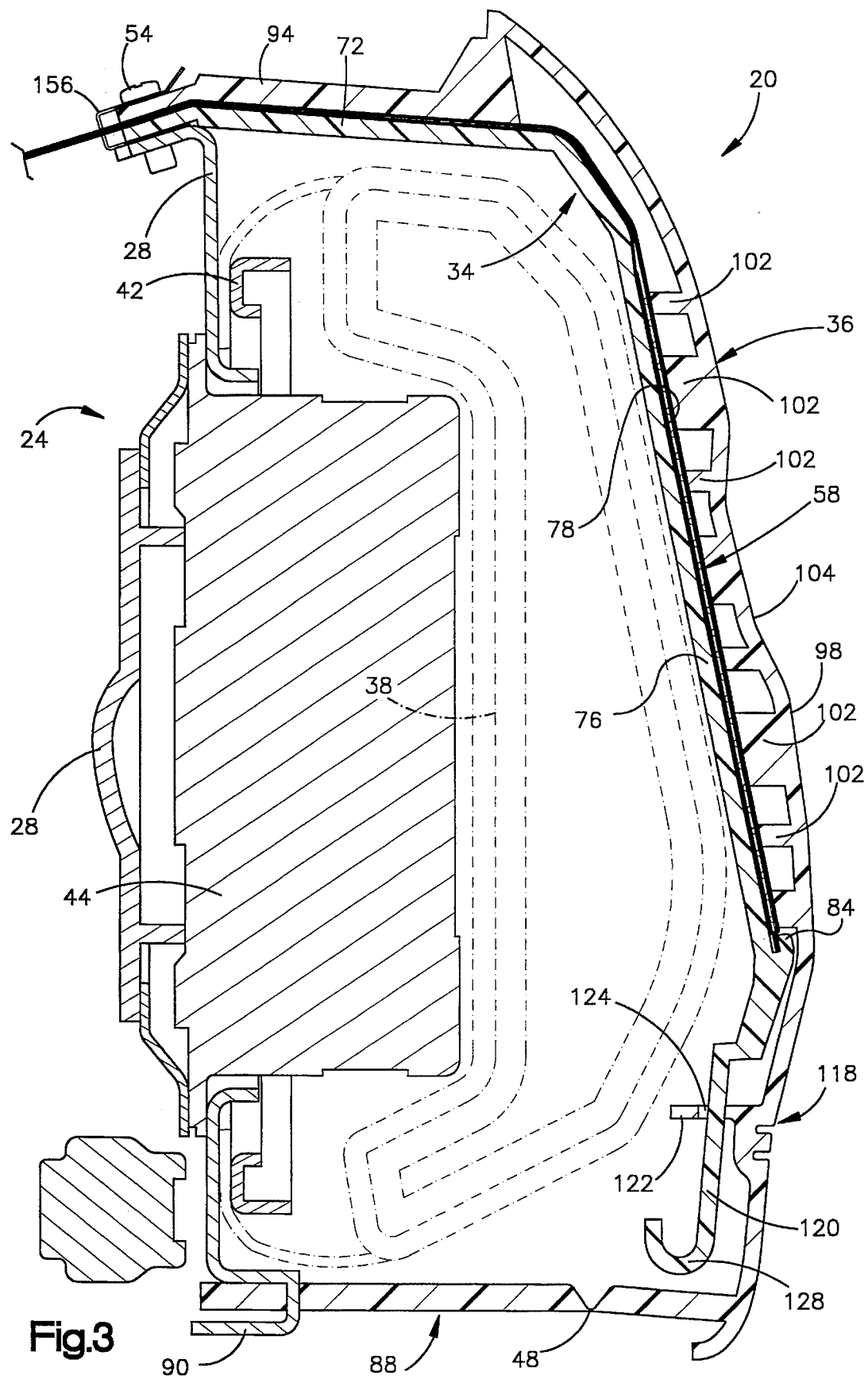
FIG. 3 is an enlarged, schematic, sectional view, taken generally along the line 3—3 of FIG. 1.

In addition to the base 28, the housing assembly 24 includes a one-piece inner cover 34 and a one-piece outer cover 36 (FIGS. 2 and 3). The inner cover 34 encloses an air bag 38. The outer cover 36 encloses the inner cover 34 and the air bag 38. The outer cover 36 has a weakened area providing a tear line 48 (best shown at the bottom of FIGS. 2 and 3). The inner cover 34 also has weakened areas providing tear lines 50 (best shown in FIG. 2) as described in greater detail below.

The air bag 38 is connected with the base 28 by an annular metal clamp ring 42 (FIG. 3) and suitable fasteners (not shown). The clamp ring 42 clamps an open end or mouth of the air bag 38 to the base 28. The air bag is clamped around a generally cylindrical air bag inflator 44. The inflator 44 is secured to the base 28 and provides a source of gas for inflating the air bag 38. Although the inflator 44 may have many different constructions, the inflator 44 may have the construction disclosed in U.S. Pat. No. 5,106,119 issued Apr. 21, 1992 and entitled "Inflator Housing".

Upon the occurrence of sudden vehicle deceleration, a suitable control apparatus (not shown) activates the inflator 44. The inflator 44, when activated, generates a flow of gas which inflates the air bag 38 to restrain movement of a driver of the vehicle. Upon initiation of inflation of the air bag 38, the outer cover 36 is ruptured along the tear line 48 (FIG. 2) and the inner cover 34 is ruptured along the tear lines 50. When this occurs, the pressure applied by the air bag 38 against the inside of the inner cover 34 pivots the inner cover and the outer cover 36 in a counterclockwise direction (as viewed in FIG. 3) about an upper connection 54 between the inner and outer covers and the base 28. As the inner and outer covers are pivoted upward about the upper connection 54, the air bag 38 is inflated under the influence of gas conducted from the inflator 44 (FIG. 3).

Figure 9:
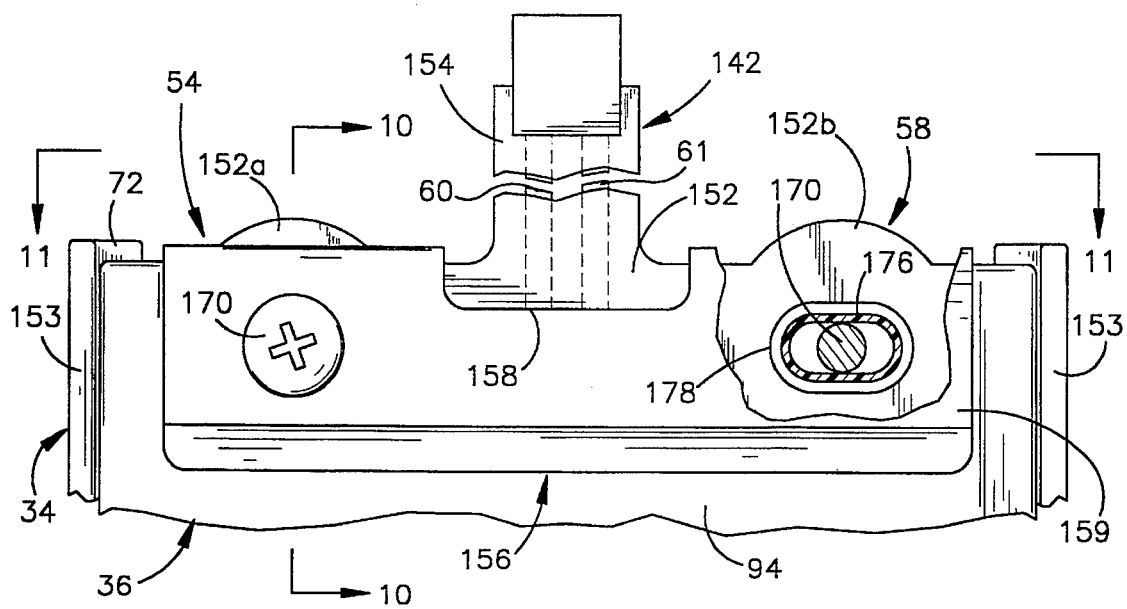
FIG. 9 is an enlarged fragmentary plan view, taken generally along the line 9—9 of FIG. 2.

A horn switch 58 (FIG. 3) is disposed between the inner and outer covers 34 and 36. The horn switch 58 is connected with a source of electrical energy, such as the vehicle battery, through conductors 60 and 61 (FIG. 9). The conductors 60 and 61 are long strips of electrically conductive material. When a vehicle horn is to be operated, pressure is manually applied against the outer cover 36 (FIG. 3) to actuate the horn switch 58 and effect operation of the horn.

Housing Assembly

The inner cover 34 of the housing assembly 24 is molded as one piece of relatively rigid polymeric material. The inner cover 34 has a pair of parallel side walls 62, only one of which is shown in FIG. 2. The side walls 62 of the one-piece inner cover 34 are connected with the base 28 by a plurality of metal tabs 66 on the base 28. The tabs 66 extend through openings 68 formed in the side walls 62. Although only the tabs 66 for connecting one of the side walls 62 with the base 28 are illustrated in FIG. 2, it should be understood that the opposite side wall is also connected with the base by similar tabs.

In addition to the parallel side walls 62, the inner cover 34 has a third side wall 72 (best shown at the upper portion of FIGS. 2 and 3). The side wall 72 of the inner cover 34 is securely connected to the base 28 at the upper connection 54. The third side wall 72 does not have a weakened area or tear line, corresponding to the tear lines 50 in the side walls 62. Therefore, upon inflation of the air bag 38, the side wall 72 of the inner cover 34 remains connected to the base 28 at the upper connection 54. The inner cover 34 does not have a side wall opposite from the side wall 72. The inner cover 34 has an open lower end portion (as viewed in FIGS. 2 and 3).

A front wall 76 (FIG. 3) of the inner cover 34 extends between and is formed as one piece with the side walls 62 and 72. The front wall 76 is formed with a recess 78 (FIG. 6) having the same configuration as a major portion 80 of the horn switch 58. The front wall 76 of the inner cover 34 provides a firm base for the horn switch 58. The front wall 76 of the inner cover 34 is provided with a plurality of retaining tabs 84 (FIG. 6) which overlap the major portion 80 of the horn switch 58 to hold the horn switch in place in the recess 78. The retaining tabs 84 are molded as one piece with the inner cover 34.

The outer cover 36 encloses the horn switch 58, inner cover 34 and air bag 38. The outer cover 36 is molded as one piece of relatively flexible polymeric material. The outer cover 36 includes a lower side wall 88 (FIGS. 2 and 3) which is connected to the base 28 by a metal tab 90 which is part of the base 28 and is similar to the metal tabs 66.

The lower side wall 88 of the outer cover 36 extends across the open lower end portion of the inner cover 34 to hold the air bag 38 in place (FIG. 2). The tear line 48 is formed at a weakened portion of the lower side wall 88. Upon initiation of inflation of the air bag 38, the lower side wall 88 of the outer cover 36 ruptures along the tear line 48 to release a lower portion of the outer cover 36 from the base 28.

An upper side wall 94 (FIGS. 2 and 3) of the outer cover 36 extends generally parallel to and is disposed opposite from the inner side wall 88 of the outer cover. The upper side wall 94 of the outer cover 36 is securely connected to the base 28 at the upper connection 54. The upper side wall 94 is relatively strong and is not weakened in the manner in which the lower side wall 88 is weakened by the tear line 48. Therefore, upon inflation of the air bag 38, the outer cover 36 remains securely connected with the base 28 at the upper connection 54.

The outer cover 36 has a front wall 98 which extends between and is formed as one piece with the lower side wall 88 and upper side wall 94. The front wall has a plurality of projections 102 (FIG. 3) which extend inwardly from the front wall 98 and engage the horn switch 58. The projections 102 have a generally X-shaped configuration (FIG. 7) in cross-section and are disposed in an array having a configuration corresponding to the configuration of the major portion 80 (FIG. 6) of the horn switch 58. The projections 102 concentrate pressure which is applied manually against an outer side surface 104 of the front wall 98 (FIG. 3) of the outer cover 36 and transmit this pressure to the horn switch 58.

A plurality of tabs 108 (FIGS. 2 and 7) extend inwardly from a rim or edge portion 110 of the one-piece outer cover 36. The tabs 108 engage rim or edge portions 112 and 114 (FIG. 6) of the inner cover 34. The tabs 108 releasably interconnect the outer cover 36 to the inner cover 34 by engagement with the edge portions 112 and 114 (FIG. 6) of the inner cover 34.

Figure 4:
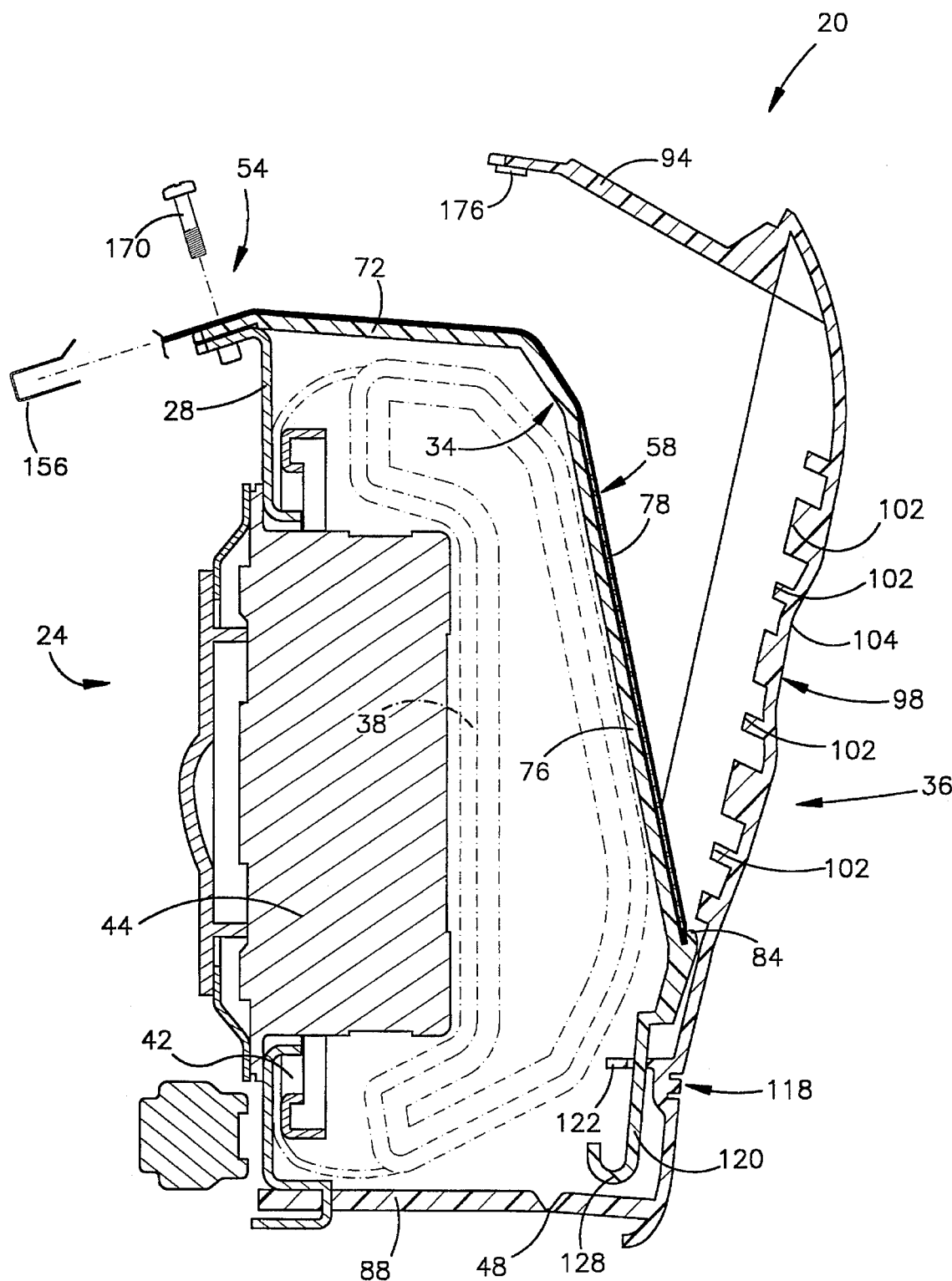
FIG. 4 is a schematic sectional view, generally similar to FIG. 3 but on a reduced scale, illustrating the manner in which a portion of an outer cover is moved away from an inner cover to expose a horn switch.
Figure 5:
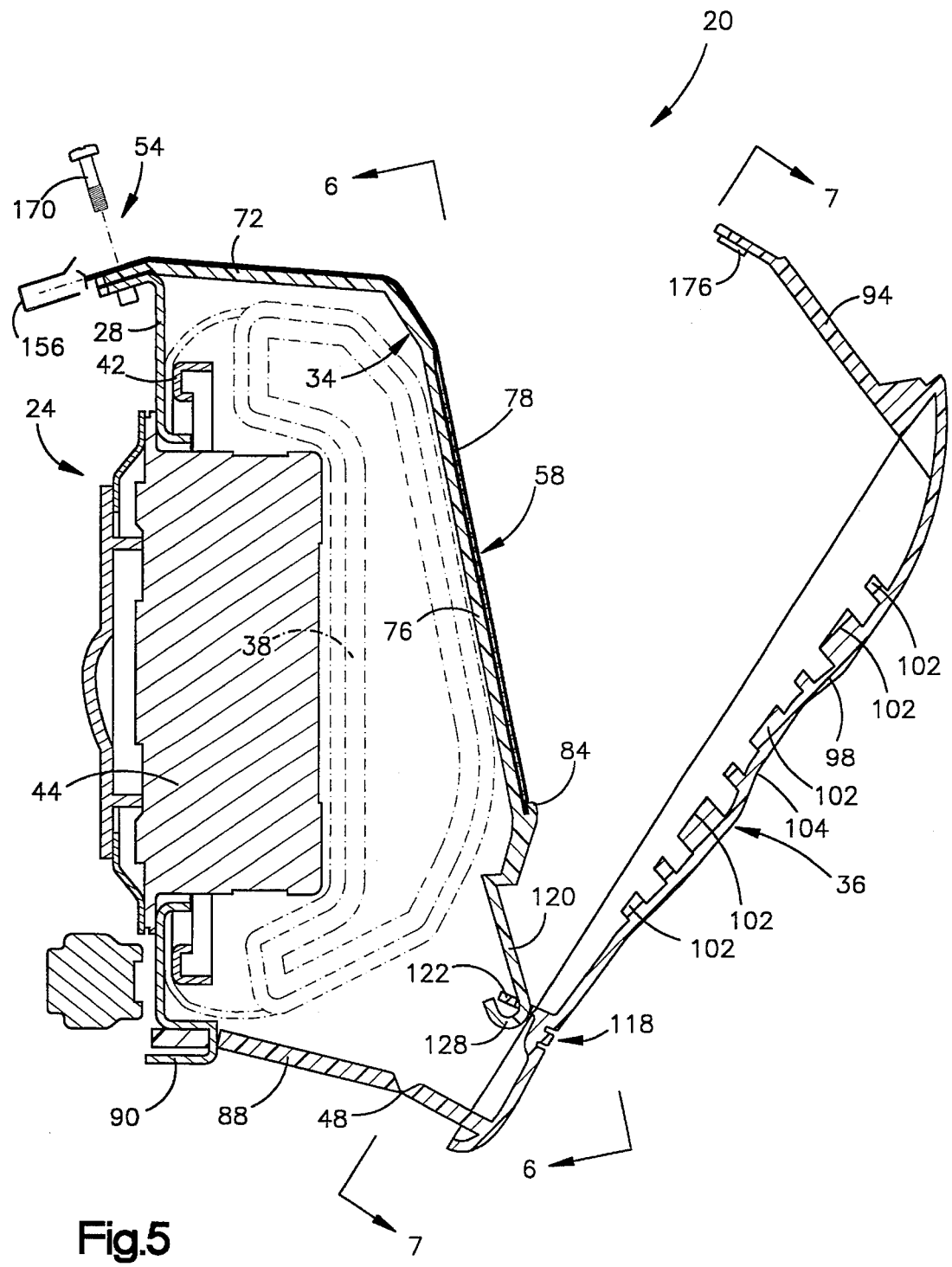
FIG. 5 is a schematic illustration, generally similar to FIG. 4, illustrating the manner in which the outer cover is moved further away from the inner cover to more fully expose the horn switch.

The inner and outer covers 34 and 36 are interconnected by a slide connection 118 (FIGS. 3–6). The slide connection 118 includes a tongue 120 which extends downwardly from and is formed as one piece with the front wall 76 of the inner cover 34. The tongue 120 extends through a loop 122 which is formed as one piece with the outer cover 36. The loop 122 defines a slot 124 through which the tongue 120 extends. To prevent the tongue 120 from being withdrawn from the loop 122, the tongue has a generally hook-shaped portion 128 (FIG. 3) which is engageable with the loop 122 (FIG. 5).

Horn Switch

The horn switch 58 has a unitary construction which allows it to be readily inserted in and removed from the recess 78 (FIG. 6) formed in the inner cover 34. The horn switch 58 is flexible so that it can be resiliently deflected and inserted beneath the tabs 84.

Figure 8:
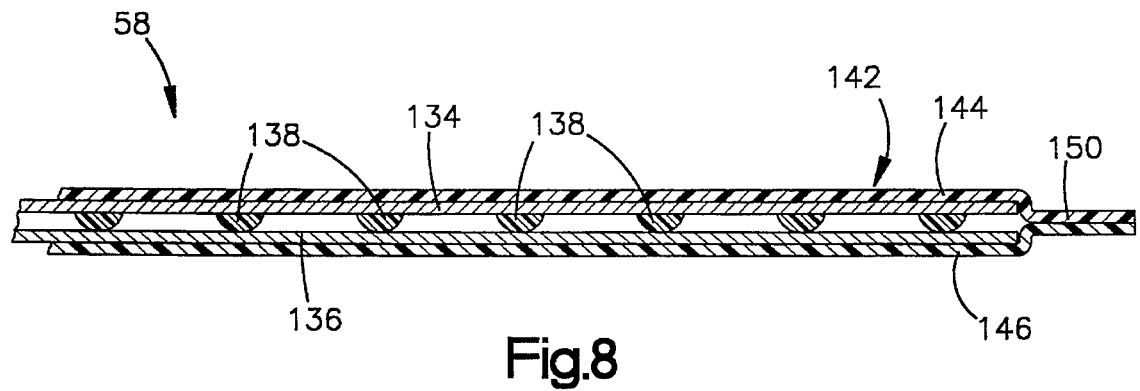
FIG. 8 (on sheet 1 of the drawings) is a fragmentary sectional view, taken generally along the line 8—8 of FIG. 6, with parts removed and illustrating the construction of the horn switch.

The horn switch 58 includes a pair of flat, side-by-side layers 134 and 136 (FIG. 8) of electrically conductive material. In one embodiment of the horn switch 58, the layers 134 and 136 are thin sheets of copper. Dots or bumps 138 of a polymeric material, which is electrically insulating, are disposed between the layers 134 and 136. The bumps 138 are secured to the layer 134 and engage the layer 136 to separate the two layers until pressure is applied against them.

Application of manual pressure against the front surface 104 (FIG. 3) of the flexible front wall 98 of the outer cover 36 is transmitted through the projections 102 to the horn switch 58. This pressure causes the two layers 134 and 136 to be resiliently deflected and moved into abutting engagement with each other at locations between the bumps 138. Engagement of the layers 134 and 136 completes an electrical connection to effect operation of the vehicle horn.

The two layers 134 and 136 (FIG. 8) of electrically conductive material are enclosed by an envelope 142 of electrically insulating material. In one specific embodiment of the horn switch 58, the envelope 142 is formed by a pair of flat layers 144 and 146 of polymeric material, specifically, Mylar®. The layers 144 and 146 of electrically insulating material are disposed in a side-by-side relationship with the layers 134 and 136 of electrically conductive material.

Figure 6:
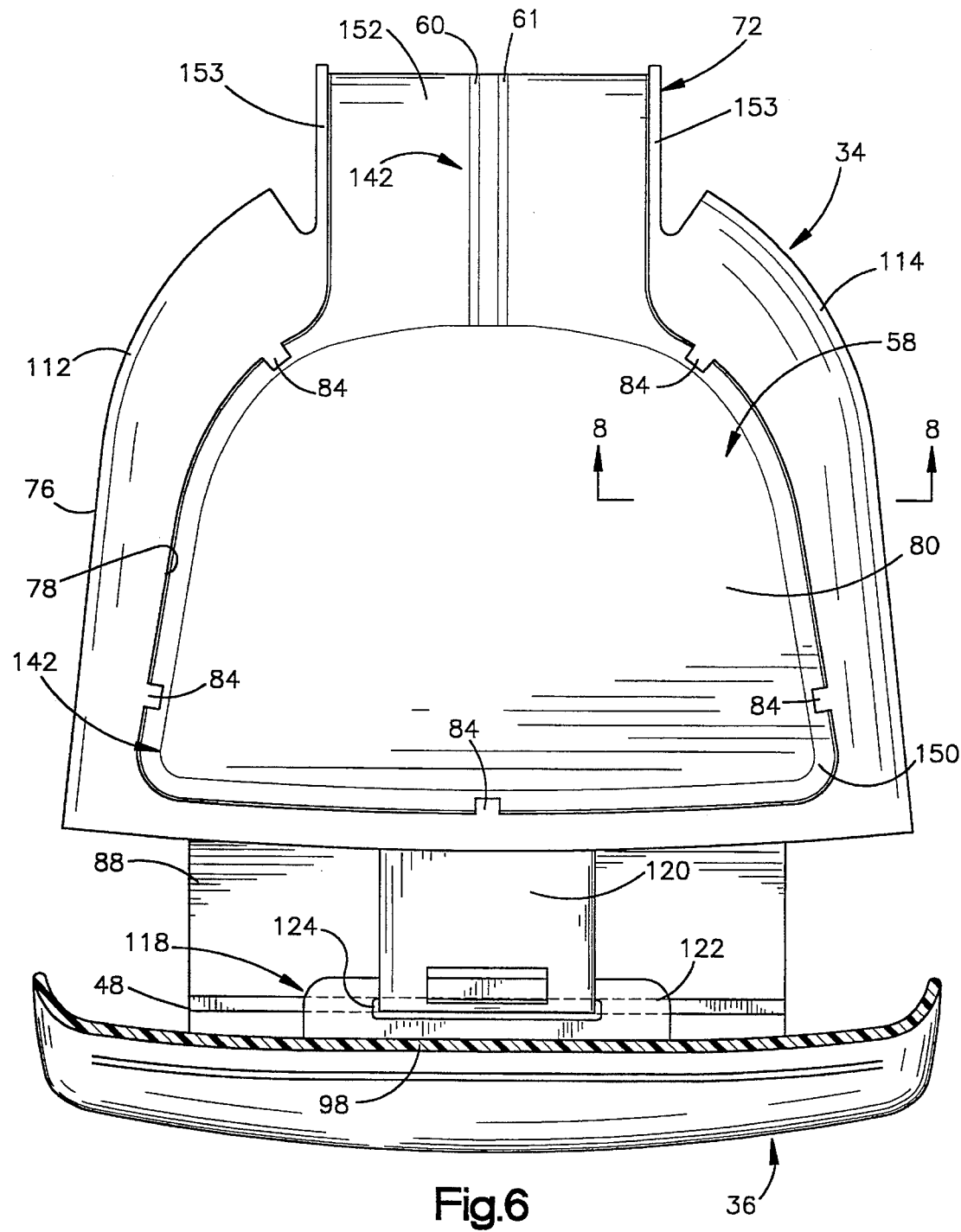
FIG. 6 is a front plan view, taken generally along the line 6—6 of FIG. 5.
Figure 7:
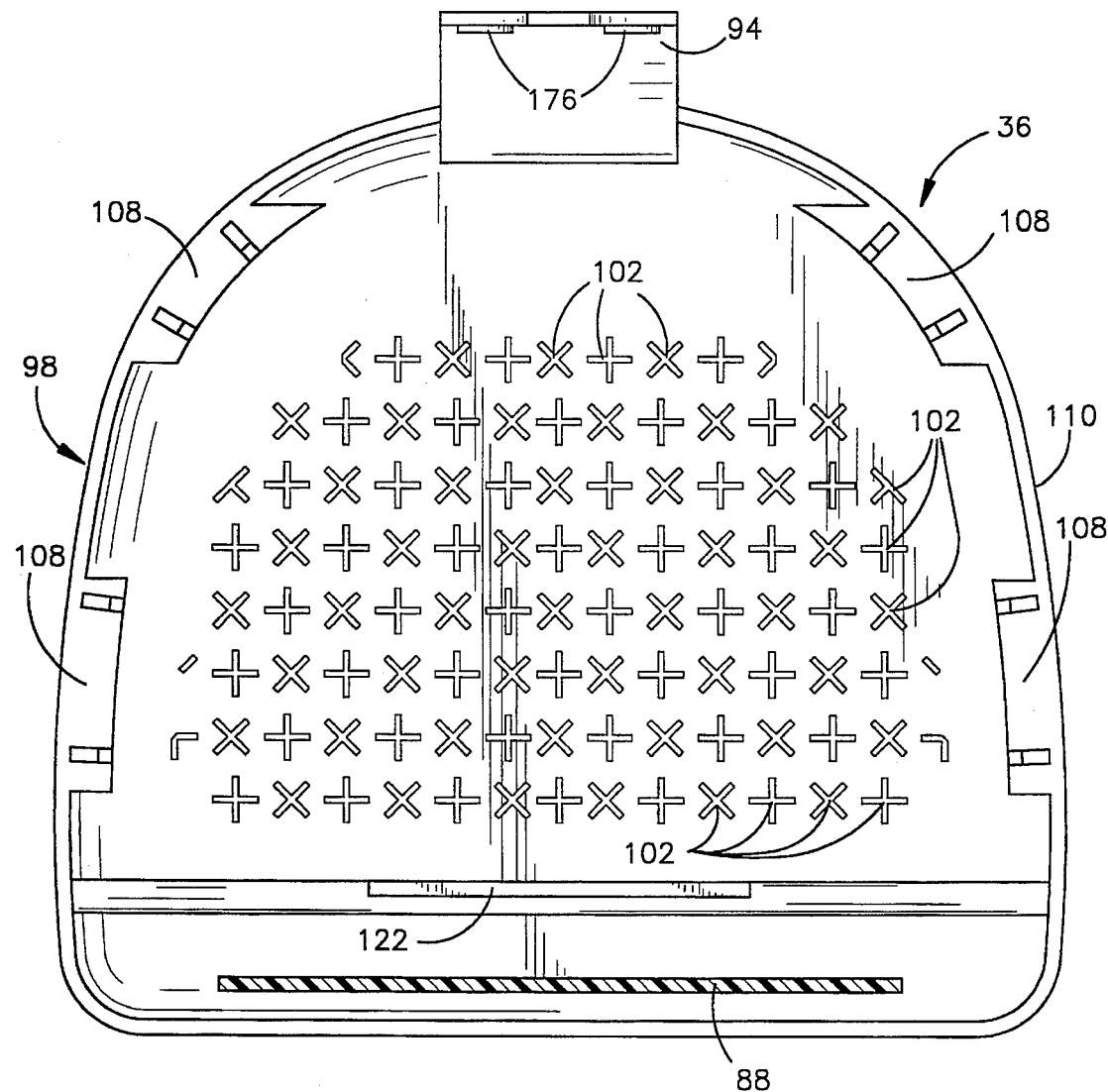
FIG. 7 is a plan view, taken generally along the line 7—7 of FIG. 5, illustrating the construction of an inner side of the outer cover.

The layers 144 and 146 of electrically insulating material are bonded together at a flat rim portion 150 to form the envelope 142. The flat rim portion 150 extends around the periphery of the layers 134 and 136 of electrically conductive material and along the conductors 60 and 61 (FIG. 6). The flat rim portion 150 is received beneath the tabs 84 (FIG. 6).

The flat layers 134 and 136 of electrically conductive material and the conductors 60 and 61 are enclosed by the envelope 142. Therefore, the horn switch 58 may be readily installed in and removed from the recess 78 as a unit. The conductor 60 is a long strip of copper formed as one piece with the flat layer 134 of electrically conductive material. The conductor 61 (FIG. 6) is a long strip of copper formed as one piece with the flat layer 136 of conductive material.

The two elongated conductors 60 and 61 are maintained in a spaced apart relationship with each other and are enclosed by the envelope 142. Thus, an elongated section 152 of the horn switch envelope 142 extends along opposite sides of and is disposed between the conductors 60 and 61 to insulate the conductors electrically from each other and to maintain the conductors in a spaced apart relationship. The elongated section 152 of the horn switch envelope 142 is disposed between shoulders 153 on the side wall 72 of the inner cover 34. The conductors 60 and 61 extend from the housing assembly 24 in a narrow strip portion 154 (FIG. 9) of the horn switch envelope 142 to enable the conductors 60 and 61 to be connected with the source of electrical energy.

Upper Connection

Figure 10:
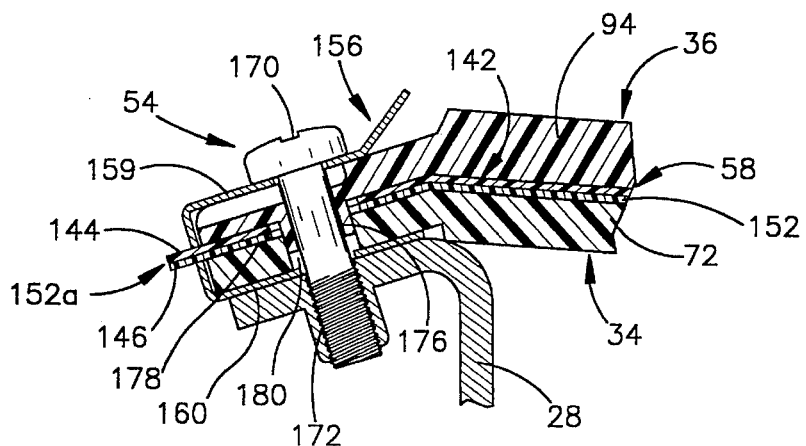
FIG. 10 is a fragmentary sectional view, taken generally along the line 10—10 of FIG. 9.
Figure 11:
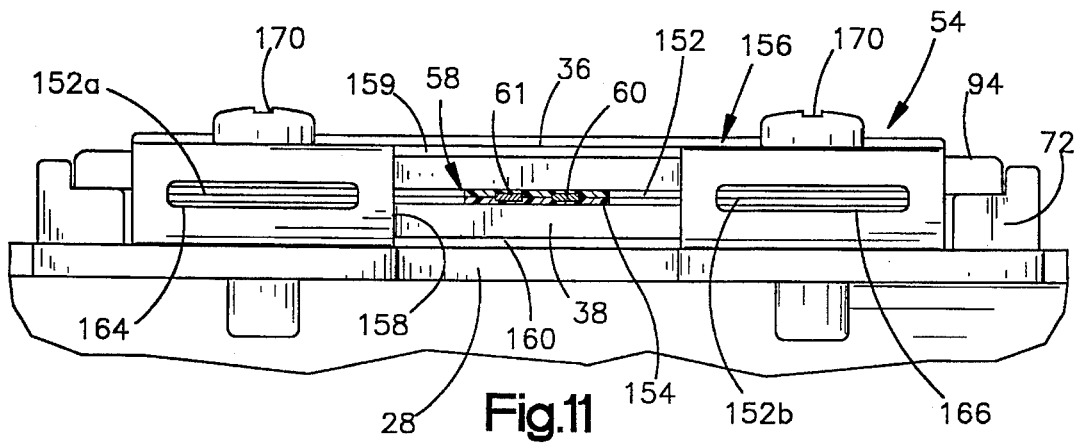
FIG. 11 is a fragmentary elevational view, taken generally along the line 11—11 of FIG. 9.

The upper connection 54 (FIGS. 2, 3, 9, 10 and 11) secures the inner cover 34, horn switch 58 and outer cover 36 to the base 28. The upper connection 54 includes a generally U-shaped metal clip 156 (FIGS. 9–11). The clip 156 has a central opening 158 (FIGS. 9 and 11) from which the conductor strips 60 and 61 and the strip portion 154 (FIG. 9) of the horn switch envelope 142 extend. The clip 156 has parallel opposite side portions 159 and 160 (FIG. 10) between which are received an end portion of the side wall 72 of the inner cover 34 and an end portion of the side wall 94 of the outer cover 36.

The envelope 142 of the horn switch 58 is disposed between the end portions of the inner and outer cover side walls 72 and 94. To facilitate positioning of the horn switch 58 relative to the inner and outer covers 34 and 36 and the base 28, the clip 156 is formed with a pair of slots 164 and 166 (FIG. 11) through which the rim portions 152a and 152b of the horn switch envelope 142 extends (FIGS. 9, 10 and 11). The clip 156, inner cover 34, horn switch 58, and outer cover 36 are releasably secured to the base 28 by a pair of fasteners 170 (FIG. 9), such as screws, which extend through the clip, outer cover 36, horn switch envelope 142 and inner cover 34 into engagement with internally threaded openings 172 (FIG. 10) in the base 28.

The horn switch 58 is positioned relative to the inner and outer covers 34 and 36 and the clip 156 by a pair of inwardly extending, generally oval projections 176 (FIGS. 9 and 10) formed on the upper side wall 94 of the outer cover 36. Each of the projections 176 extends through an opening 178 formed in the rim portion 150 of the horn switch 58 into an opening 180 (FIG. 10) formed in the third side wall 72 of the inner cover 34. By extending through the rim portion 150 of the horn switch envelope 142 into the openings 180 in the inner cover 34, the projections 176 from the outer cover 36 position the horn switch 58 and inner cover relative to the outer cover.

Horn Switch Access

Access is obtained to the horn switch 58 by releasing the upper connection 54 and resiliently deflecting the outer cover 36 relative to the inner cover 34, in the manner indicated schematically in FIG. 4. The upper portion of the outer cover 36 is thus pivoted, in a clockwise direction as viewed in FIG. 4, away from the inner cover 34 and horn switch 58 to a partially open position.

Although it may be possible to remove the horn switch 58 and install a new horn switch when the outer cover is in the partially open position shown in FIG. 4, it is contemplated that installation and removal of the horn switch 58 will be facilitated by moving the outer cover 36 to the fully open position of FIG. 5. As the outer cover 36 moves from the partially open position of FIG. 4 to the fully open position of FIG. 5, relative movement occurs between the inner and outer covers 34 and 36 at the slide connection 118. Thus, the loop 122 moves downwardly (as viewed in FIGS. 4 and 5) along the tongue 120 as the outer cover 36 is moved away from the inner cover. When the outer cover 36 has been moved to the fully open position shown in FIG. 5, the loop 122 will engage the generally hook-shaped end portion 128 of the tongue 120 to stop sliding movement of the loop.

The lower side wall 88 of the outer cover 36 deflects at the tear line 48. This results in the front wall 98 of the outer cover being moved away from the front wall 76 of the inner cover 34 by pivoting movement of the front wall 98 of the outer cover 36 about the slide connection 118. When the outer cover 36 is in the fully open position, access to the air bag 38 is blocked by the front wall 76 of the inner cover 34, the side walls 62 and 72 on the inner cover 34, and by the side wall 88 on the outer cover 36.

Since the horn switch 58 is a unitary assembly, it can be removed as one piece from the recess 78 in the front wall 76 of the inner cover 34. Insertion of a new horn switch 58 is also easily accomplished due to the unitary construction of the horn switch.

Once a new horn switch 58 has been installed in the recess 78, the outer cover 36 is pivoted from the fully open position of FIG. 5 through the partially open position of FIG. 4 to the closed position of FIG. 3. The upper connection 54 is then reinstalled to interconnect the inner and outer covers 34 and 36 and the new horn switch 58.

From the above description of the invention, those skilled in the art will perceive improvements, changes and modifications. Such improvements, changes and modifications within the skill of the art are intended to be covered by the appended claims.

Having described the invention, the following is claimed:

1. A housing assembly for enclosing an air bag on a steering wheel of a vehicle having a horn, said housing assembly comprising:

a base;

an inner cover which at least partially encloses the air bag;

an outer cover which at least partially encloses said inner cover and the air bag;

a first connector means for releasably connecting said outer cover with said base at a first location;

horn switch means disposed between said inner and outer covers for effecting operation of the horn, said horn switch means including first and second layers of electrically conductive material and an envelope of electrically insulating material enclosing said first and second layers of electrically conductive material, said first and second layers of electrically conductive material and said envelope of electrically insulating material being interconnected for installation in and removal from said housing assembly as a unit;

a second connector means for connecting said outer cover with said inner cover at a second location, said second connector means maintaining a connection between said outer and inner covers upon release of said first connector means, a portion of said outer cover being disposed between said first and second locations, said second connector means including means for permitting manual movement of said outer cover relative to said inner cover to permit removal of said horn switch means upon releasing said first connector means while said second connector means connects said outer cover with said inner cover; and retainer means for releasably retaining said horn switch means against movement relative to one of said inner and outer covers and permitting removal of said horn switch means from said housing assembly.

2. A housing assembly as set forth in claim 1 wherein said retainer means is disposed in engagement with said envelope of electrically insulating material and is spaced from said layers of electrically conducting material.

3. A housing assembly as set forth in claim 1 wherein said inner cover is formed as a single piece of material and includes surface means for defining a recess having a configuration corresponding to the configuration of at least a portion of said envelope of electrically insulating material, said horn switch means being at least partially disposed in said recess.

4. A housing assembly as set forth in claim 3 wherein said inner cover includes a plurality of retainer portions for engaging said envelope of electrically insulating material to retain said horn switch means in said recess.

5. A housing assembly as set forth in claim 1 wherein said horn switch means includes an elongated strip of electrically conductive material connected with one of said layers of electrically conductive material and extending outward of said inner and outer covers, said envelope of electrically insulating material including an elongated portion which encloses said strip of electrically conductive material.

6. A housing assembly as set forth in claim 1 further including connector means extending through said inner cover, said outer cover, and said envelope of electrically insulating material to interconnect said inner and outer covers and said horn switch means.

7. A housing assembly for enclosing an air bag on a steering wheel of a vehicle having a horn, said housing assembly comprising:

a base;

an inner cover having a plurality of side walls connected with said base and a main wall extending between said side walls to at least partially enclose the air bag, a one-piece outer cover having a plurality of side walls and a main wall extending between said side walls of said outer cover and overlying said main wall of said inner cover to at least partially enclose said inner cover;

first connector means for releasably connecting a first side wall of said plurality of side walls of said outer cover with said base;

second connector means for connecting a second side wall of said plurality of side walls of said outer cover with said base;

third connector means for connecting said main wall of said outer cover with said main wall of said inner cover at a location between said first and second side walls of said outer cover; and horn switch means for effecting operation of the horn, said horn switch means being at least partially disposed between said main wall of said inner cover and said main wall of said outer cover at a location between said first side wall of said outer cover and said third connector means;

said first connector means being releasable to enable at least a portion of said one-piece outer cover disposed between said first and third connector means to move away from said inner cover to expose said horn switch means while said third connector means interconnects said main walls of said inner and outer covers.

8. A housing assembly as set forth in claim 7 further including means for defining a tear line in said outer cover at a location between said second and third connector means, said outer cover being rupturable along the tear line to release the air bag for deployment from said housing assembly.

9. A housing assembly as set forth in claim 7 wherein said horn switch means includes surface means for defining an opening which extends through said horn switch means, a first one of said inner and outer covers including surface means for defining an opening in said first one of said inner and outer covers, a second one of said inner and outer covers including a projection which extends through the opening in said horn switch means into the opening in said first one of said inner and outer covers to interconnect said horn switch means and said inner and outer covers.

10. A housing assembly as set forth in claim 9 wherein said projection on said second one of said inner and outer covers and said opening in said first one of said inner and outer covers move into a spaced apart relationship upon movement of said portion of said outer cover away from said inner cover to release said horn switch means for removal from said housing assembly.

11. A housing assembly as set forth in claim 7 wherein said horn switch means includes first and second layers of electrically conductive material and an envelope of electrically insulating material enclosing said first and second layers of electrically conductive material, said first and second layers of electrically conductive material and said envelope of electrically insulating material being interconnected for installation in and removal from said housing assembly as a unit.

12. A housing assembly for enclosing an air bag on a steering wheel of a vehicle having a horn, said housing assembly comprising:

an inner cover which at least partially encloses the air bag;

an outer cover which at least partially encloses said inner cover and the air bag;

horn switch means disposed between said inner and outer covers for effecting operation of the horn, said horn switch means including first and second layers of electrically conductive material and an envelope of electrically insulating material enclosing said first and second layers of electrically conductive material, said first and second layers of electrically conductive material and said envelope of electrically insulating material being interconnected for installation in and removal from said housing assembly as a unit;

a base;

releasable connector means for releasably connecting said outer cover with said base at a first location; and second connector means for connecting said outer cover with said inner cover at a second location, a portion of said outer cover disposed between said first and second locations being manually movable relative to said inner cover to expose said horn switch means upon releasing of said releasable connector means, said second connector means including slip joint means for maintaining a connection between said inner cover and said outer cover while enabling at least a portion of said second connector means to move relative to said base upon movement of the portion of said outer cover to expose said horn switch means.

13. A housing assembly for enclosing an air bag on a steering wheel of a vehicle having a horn, said housing assembly comprising:

an inner cover which at least partially encloses the air bag;

an outer cover which at least partially encloses said inner cover and the air bag; and horn switch means disposed between said inner and outer covers for effecting operation of the horn, said horn switch means including first and second layers of electrically conductive material and an envelope of electrically insulating material enclosing said first and second layers of electrically conductive material, said first and second layers of electrically conductive material and said envelope of electrically insulating material being interconnected for installation in and removal from said housing assembly as a unit;

a base;

releasable connector means for releasably connecting said outer cover with said base at a first location; and second connector means for connecting said outer cover with said inner cover at a second location, a portion of said outer cover disposed between said first and second locations being manually movable relative to said inner cover to expose said horn switch means upon releasing of said releasable connector means, said second connector means including means for maintaining a connection between said outer cover and said inner cover upon manual movement of the portion of said outer cover disposed between said first and second locations to expose said horn switch means.

14. A housing assembly for enclosing an air bag on a steering wheel of a vehicle having a horn, said housing assembly comprising:

a base;

an inner cover having a plurality of side walls connected with said base and a main wall extending between said side walls to at least partially enclose the air bag, a one-piece outer cover having a plurality of side walls and a main wall extending between said side walls of said outer cover and overlying said main wall of said inner cover to at least partially enclose said inner cover;

first connector means for releasably connecting a first side wall of said plurality of side walls of said outer cover with said base;

second connector means for connecting a second side wall of said plurality of side walls of said outer cover with said base;

third connector means for connecting said main wall of said outer cover with said main wall of said inner cover at a location between said first and second side walls of said outer cover; and horn switch means for effecting operation of the horn, said horn switch means being at least partially disposed between said main wall of said inner cover and said main wall of said outer cover at a location between said first side wall of said outer cover and said third connector means;

said first connector means being releasable to enable at least a portion of said one-piece outer cover disposed between said first and third connector means to move away from said inner cover to expose said horn switch means while said third connector means interconnects said main walls of said inner and outer covers;

said third connector means including slip joint means for maintaining a connection between said inner cover and said outer cover while enabling the location of at least a portion of said third connector means to move relative to said base upon movement of a portion of said one-piece outer cover to expose said horn switch means.

15. A housing assembly as set forth in claim 14 wherein said slip joint means includes a tongue extending from one of said inner and outer covers and surface means for defining an opening connected with the other of said inner and outer covers, said tongue extending into the opening and being movable relative to the opening to accommodate movement of said outer cover relative to said base.

16. A housing assembly for enclosing an air bag on a steering wheel of a vehicle having a horn, said housing assembly comprising:

a base;

an inner cover having a plurality of side walls connected with said base and a main wall extending between said side walls to at least partially enclose the air bag, a one-piece outer cover having a plurality of side walls and a main wall extending between said side walls of said outer cover and overlying said main wall of said inner cover to at least partially enclose said inner cover;

first connector means for releasably connecting a first side wall of said plurality of side walls of said outer cover with said base;

second connector means for connecting a second side wall of said plurality of side walls of said outer cover with said base;

third connector means for connecting said main wall of said outer cover with said main wall of said inner cover at a location between said first and second side walls of said outer cover; and horn switch means for effecting operation of the horn, said horn switch means being at least partially disposed between said main wall of said inner cover and said main wall of said outer cover at a location between said first side wall of said outer cover and said third connector means;

said first connector means being releasable to enable at least a portion of said one-piece outer cover disposed between said first and third connector means to move away from said inner cover to expose said horn switch means while said third connector means interconnects said main walls of said inner and outer covers and said first connector means including means for releasably connecting said horn switch means with said base.

17. An apparatus comprising:

a base connected with a vehicle steering wheel;

an air bag connected with said base;

inflator means connected with said base for providing gas to inflate said air bag from a collapsed condition to an inflated condition;

an inner cover which is connected with said base and at least partially encloses said air bag when said air bag is in the collapsed condition;

an outer cover which is connected with said base and at least partially encloses said inner cover and said air bag when said air bag is in the collapsed condition;

horn switch means disposed between said inner and outer covers for effecting operation of a horn, said horn switch means including a plurality of layers of material disposed in a side-by-side relationship, said plurality of layers of material including surface means for defining an opening extending through at least some of said layers of said plurality of layers of material;

a first one of said inner and outer covers including a projection which extends through the opening in said plurality of layers of material;

a second one of said inner and outer covers including surface means for defining an opening in said second one of said covers, said projection extending through the opening in said plurality of layers of material and into the opening in said second one of said covers to interconnect said inner and outer covers and said horn switch means;

first connector means for releasably connecting said outer cover with said base at a first location;

second connector means for connecting said outer cover with said base at a second location; and third connector means for connecting said inner cover with said outer cover at a third location which is intermediate said first and second locations;

said first connector means being releasable to enable at least a portion of said one-piece outer cover disposed between said first and second locations to move away from said inner cover to expose said horn switch means while said third connector means interconnects said inner and outer covers;

said third connector means including slip joint means for maintaining a connection between said inner cover and said outer cover while enabling the location of at least a portion of said third connector means to move relative to said base upon movement of a portion of said outer cover to expose said horn switch means.

18. An apparatus as set forth in claim 17 wherein said slip joint means includes a tongue extending from one of said inner and outer covers and surface means for defining an opening connected with the other of said inner and outer covers, said tongue extending into the opening and being movable relative to the opening to accommodate movement of said outer cover relative to said base.

19. An apparatus comprising:

a base connected with a vehicle steering wheel;

an air bag connected with said base;

inflator means connected with said base for providing gas to inflate said air bag from a collapsed condition to an inflated condition;

an inner cover which is connected with said base and at least partially encloses said air bag when said air bag is in the collapsed condition;

an outer cover which is connected with said base and at least partially encloses said inner cover and said air bag when said air bag is in the collapsed condition;

horn switch means disposed between said inner and outer covers for effecting operation of a horn, said horn switch means including a plurality of layers of material disposed in a side-by-side relationship, said plurality of layers defining an opening extending through at least some of said layers of said plurality of layers of material;

a first one of said inner and outer covers including a projection which extends through the opening in said plurality of layers of material, said projection having surface means defining an opening extending through said projection;

a second one of said inner and outer covers including surface means defining an opening in said second one of said inner and outer covers;

said projection extending through the opening in said plurality of layers of material and into the opening in said second one of said covers to interconnect said inner and outer covers and said horn switch means; and fastener means extending through the opening in said projection and the opening in said second one of said inner and outer covers for connecting said base with said inner and outer covers and said horn switch means.

20. An apparatus as set forth in claim 19 wherein said plurality of layers of material include first and second layers of electrically conductive material and an envelope of electrically insulating material enclosing said first and second layers of electrically conductive material, said first and second layers of electrically conductive material and said envelope of electrically insulating material being interconnected for installation in and removal from between said inner and outer covers as a unit, said opening in said plurality of layers of material being formed in said envelope of electrically insulating material.

21. An apparatus as set forth in claim 19 further including first connector means for releasably connecting said outer cover with said base at a first location, second connector means for connecting said outer cover with said base at a second location, third connector means for connecting said inner cover with said outer cover at a third location which is intermediate said first and second locations, said first connector means being releasable to enable at least a portion of said one-piece, outer cover disposed between said first and second locations to move away from said inner cover to expose said horn switch means while-said third connector means interconnects said inner and outer covers.

22. An apparatus as set forth in claim 21 wherein said first connector means extends through the opening formed in at least some of said plurality of layers of material.

23. An apparatus as set forth in claim 21 further including means for defining a tear line in said outer cover at a location between said second and third connector means, said outer cover being rupturable along the tear line to release said air bag.

24. A housing assembly for enclosing an air bag on a steering wheel of a vehicle having a horn, said housing assembly comprising:

a base;

an inner cover which at least partially encloses the air bag;

an outer cover which at least partially encloses said inner cover and the air bag;

a first connector means for releasably connecting said outer cover with said base at a first location;

horn switch means disposed between said inner and outer covers for effecting operation of the horn, said horn switch means including first and second layers of electrically conductive material and an envelope of electrically insulating material enclosing said first and second layers of electrically conductive material, said first and second layers of electrically conductive material and said envelope of electrically insulating material being interconnected for installation in and removal from said housing assembly as a unit;

a second connector means for connecting said outer cover with said inner cover at a second location, said second connector means maintaining a connection between said outer and inner covers upon release of said first connector means, a portion of said outer cover disposed between said first and second locations being manually movable relative to said inner cover to expose said horn switch means upon releasing said first connector means while said second connector means connects said outer cover with said inner cover;

retainer means for releasably retaining said horn switch means against movement relative to one of said inner and outer covers and permitting removal of said horn switch means from said housing assembly; and means for defining a tear line in said outer cover at a location spaced from the portion of said outer cover disposed between said first and second locations, said outer cover being rupturable along the tear line to release the air bag for deployment from said housing assembly.

25. A housing assembly for enclosing an air bag on a steering wheel of a vehicle having a horn, said housing assembly comprising:

a base;

an inner cover which at least partially encloses the air bag;

an outer cover which at least partially encloses said inner cover and the air bag;

a first connector means for releasably connecting said outer cover with said base at a first location;

horn switch means disposed between said inner and outer covers for effecting operation of the horn, said horn switch means including first and second layers of electrically conductive material and an envelope of electrically insulating material enclosing said first and second layers of electrically conductive material, said first and second layers of electrically conductive material and said envelope of electrically insulating material being interconnected for installation in and removal from said housing assembly as a unit;

a second connector means for connecting said outer cover with said inner cover at a second location, said second connector means maintaining a connection between said outer and inner covers upon release of said first connector means, a portion of said outer cover disposed between said first and second locations being manually movable relative to said inner cover to expose said horn switch means upon releasing said first connector means while said second connector means connects said outer cover with said inner cover;

retainer means for releasably retaining said horn switch means against movement relative to one of said inner and outer covers and permitting removal of said horn switch means from said housing assembly; and third connector means for connecting said outer cover with said base at a third location, a portion of said outer cover disposed between said second and third locations being resiliently deflectable upon manual movement of the portion of said outer cover disposed between said first and second locations to expose said horn switch means.

26. A housing assembly for enclosing an air bag on a steering wheel of a vehicle having a horn, said housing assembly comprising:

a base;

an inner cover which at least partially encloses the air bag;

an outer cover which at least partially encloses said inner cover and the air bag;

a first connector means for releasably connecting said outer cover with said base at a first location;

horn switch means disposed between said inner and outer covers for effecting operation of the horn, said horn switch means including first and second layers of electrically conductive material and an envelope of electrically insulating material enclosing said first and second layers of electrically conductive material, said first and second layers of electrically conductive material and said envelope of electrically insulating material being interconnected for installation in and removal from said housing assembly as a unit;

a second connector means for connecting said outer cover with said inner cover at a second location, said second connector means maintaining a connection between said outer and inner covers upon release of said first connector means, a portion of said outer cover disposed between said first and second locations being manually movable relative to said inner cover to expose said horn switch means upon releasing said first connector means while said second connector means connects said outer cover with said inner cover; and retainer means for releasably retaining said horn switch means against movement relative to one of said inner and outer covers and permitting removal of said horn switch means from said housing assembly;

said envelope of electrically insulating material including surface means for defining an opening extending through said envelope of electrically insulating material, a first one of said inner and outer covers including a projection which extends through the opening in said envelope of electrically insulating material.

27. A housing assembly as set forth in claim 26 wherein a second one of said inner and outer covers includes surface means for defining an opening into which the projection from the first one of said inner and outer covers extends to interconnect said inner and outer covers and said envelope of electrically insulating material.

* * * * *

UNITED STATES PATENT AND TRADEMARK OFFICE
CERTIFICATE OF CORRECTION

PATENT NO. : 5,499,841
DATED : March 19, 1996
INVENTOR(S) : Donna M. Trojan, et. al.

It is certified that error appears in the above-indentified patent and that said Letters Patent is hereby corrected as shown below:

Title page, item [54] and col. 1, line 1, delete --Vehicle Safety Apparatus A--.

Signed and Sealed this

Nineteenth Day of November, 1996

Attest:

BRUCE LEHMAN

Attesting Officer

Commissioner of Patents and Trademarks